US008924482B2

(12) United States Patent
Goldsmith (10) Patent No.: US 8,924,482 B2
(45) Date of Patent: Dec. 30, 2014

(54) METHOD AND SYSTEM FOR POLICING EVENTS WITHIN AN ONLINE COMMUNITY (76) Inventor: Charlton Brian Goldsmith, Richmond (AU)

( * ) Notice: Subject to any disclaimer, the term of this patent is extended or adjusted under 35 U.S.C. 154(b) by 228 days.

(21) Appl. No.: 13/326,539

(22) Filed: Dec. 15, 2011

(65) Prior Publication Data

US 2012/0158852 A1 Jun. 21, 2012

(30) Foreign Application Priority Data

Dec. 15, 2010 (AU) ................................ 2010905495
Feb. 28, 2011 (AU) ................................ 2011900694

(51) Int. Cl.
*G06F 15/16* (2006.01)
*G06Q 10/10* (2012.01)
*G06Q 50/00* (2012.01)

(52) U.S. Cl.
CPC ............... *G06Q 10/10* (2013.01); *G06Q 50/01* (2013.01)
USPC ............... 709/205; 709/223; 705/37; 705/39

(58) Field of Classification Search
CPC ..... H04L 67/22; H04L 67/306; H04L 12/588; G06F 15/16; G06F 17/30289
USPC ............... 709/205, 223; 705/1.1, 7.38, 37, 39
See application file for complete search history.

(56) References Cited

U.S. PATENT DOCUMENTS

| 6,336,133 | B1 | 1/2002 | Morris et al. |
| 6,374,290 | B1 | 4/2002 | Scharber et al. |
| 6,853,974 | B1 * | 2/2005 | Akifuji et al. ................ 705/7.26 |
| 6,978,304 | B2 | 12/2005 | Fertell et al. |
| 7,069,298 | B2 * | 6/2006 | Zhu et al. ...................... 709/204 |
| 7,656,288 | B2 * | 2/2010 | Joslin et al. ................... 340/521 |
| 2004/0073810 | A1 * | 4/2004 | Dettinger et al. ............. 713/201 |
| 2005/0027639 | A1 * | 2/2005 | Wong ............................. 705/37 |
| 2006/0265418 | A1 * | 11/2006 | Dolezal et al. ................ 707/102 |
| 2007/0124336 | A1 * | 5/2007 | Arellano ..................... 707/104.1 |
| 2008/0046516 | A1 * | 2/2008 | Hyoung et al. ............... 709/205 |
| 2008/0256013 | A1 * | 10/2008 | Loveless ......................... 706/47 |
| 2009/0164582 | A1 | 6/2009 | Dasgupta et al. |
| 2009/0307129 | A1 * | 12/2009 | Matkowsky et al. ............ 705/39 |
| 2010/0281427 | A1 * | 11/2010 | Ghosh et al. .................. 715/811 |
| 2011/0231892 | A1 | 9/2011 | Tovar |

* cited by examiner

*Primary Examiner* — Tesfay Yohannes
(74) *Attorney, Agent, or Firm* — Duane Morris LLP (57) ABSTRACT A method and system for policing events within an online community comprising a plurality of users having corresponding user information stored in a user database. The method comprises: receiving data indicative of an event from a user of the plurality of users of the online community; selecting a plurality of eligible users (such as from the plurality of users, for example based on the stored user information) to form a jury to evaluate the data indicative of the event with respect to rules for the online community stored in a rules database; and electronically taking an action in respect of corresponding stored user information of a user who performed the event based on the jury evaluation of the data with respect to the rules for the online community.

34 Claims, 5 Drawing Sheets

METHOD AND SYSTEM FOR POLICING EVENTS WITHIN AN ONLINE COMMUNITY

RELATED APPLICATION

This application is based on and claims the benefit of the filing and priority dates of Australian patent applications nos. 2010905495 filed 15 Dec. 2010 and 2011900694 filed 28 Feb. 2011, the content of which as filed is incorporated herein by reference in its entirety.

FIELD OF THE INVENTION

The present invention relates to a method and system for policing events within an online community. The invention is of particular, though not exclusive, application in policing events such as communications within an online community.

BACKGROUND OF THE INVENTION

An existing method and system for policing events within an online community includes users of the online community requesting publication of communications (e.g. pictures) to a moderator of the online community for evaluation with respect to rules for the online community.

For example, current methods and systems for policing communications within online communities are directed to users reporting allegedly offensive behaviour of other users to one or more moderators of the online community. Generally, the moderators receive these reports for verification and process them in due course. However, such a system may give rise to a large number of false or nuisance reports where the reported user has not in fact performed an offence.

In addition, some online communities have a large number of users. For example, the online chat community Chat Roulette (www.chatroulette.com) may have between 20,000 and 30,000 users online at any one time forming the online community. In such a community there may be a long lag time for moderators to process reports of alleged offensive behaviour.

SUMMARY OF THE INVENTION

According to one aspect of the present invention, there is provide a method of policing events within an online community comprising a plurality of users having corresponding user information stored in a user database, the method comprising:
  receiving data indicative of an event from a user of said plurality of users of the online community;
  selecting a plurality of eligible users to form a jury to evaluate the data indicative of the event with respect to rules for the online community stored in a rules database; and
  electronically taking an action in respect of corresponding stored user information of a user who performed the event based on the jury evaluation of the data with respect to the rules for the online community.

In certain embodiments, the rules comprise a requirement that the users of the online community behave ethically, courteously, according to stipulated values of the online community or lawfully (or some combination of these).

In one embodiment, the plurality of eligible users selected to form the jury are selected from the plurality of users of the online community. This may be based on the stored user information.

In another embodiment, the plurality of eligible users may be from a predefined group of users within or external to the online community.

In an embodiment, selecting the plurality of eligible users to form the jury includes electing the plurality of eligible users (whether from a pool of users that volunteer to be on the jury, from the plurality of users of the online community, by self-election, or otherwise).

The selecting of the plurality of eligible users to form the jury may include random selection from a larger group of possible eligible users (such as the users of the online community deemed eligible for participation on the jury).

The method may comprise determining the jury evaluation by receiving votes from members of the jury and establishing the jury evaluation according to a majority of the votes. The majority may be of any desired type, such as a simple majority (>50%), a super majority (>75% or the like), or unanimity (100%).

According to an embodiment, the data indicative of the event can include a nominated sanction (that is, possibly to be imposed if the jury evaluates that the event was against the relevant rule(s)). In such an embodiment, the nominated sanction may be tagged as:
  i) recommended (indicating that the user that reports the event has recommended the sanction (such as to block, ban or remove offensive content));
  ii) voted (indicating that the jury can vote from a selection of verdicts including their own recommendation); or
  iii) determined (indicating that the online community has predetermined sanctions for a range of situations/reports).

In some embodiments, the method comprises determining whether a user is an eligible user by receiving data from said user indicative of his or her willingness to be selected for the jury.

This may be done by polling all prospective eligible users for willingness, made a condition of membership of the online community, or otherwise.

In an embodiment, the event comprises electronically publishing a user profile within the online community.

In an embodiment, the rules for the online community comprise users publishing verified user profiles.

In an embodiment, the action comprises electronically verifying the user profile in the user database for publication if the jury evaluates the data to verify the user.

In an embodiment, the action further comprises storing said user profile in association with the corresponding user information in the user database.

In an embodiment, the data comprises verification data of the user.

In an embodiment, the verification data comprises a video or other media file created by the user to be evaluated by the jury to verify the user profile.

In an embodiment, the event comprises a communication within the online community.

In an embodiment, the communication comprises electronically publishing a media file within the online community.

In an embodiment, the rules for the online community comprise users publishing sanitized media files.

In an embodiment, the action comprises electronically enabling the media file in the user database to be published if the jury evaluates the data to be sanitary.

In an embodiment, the action further comprises storing said media file in association with the stored user information in the user database.

In an embodiment, the data comprises the media file.

In an embodiment, the method further comprises receiving a report from a reporting user of said plurality of users of the online community reporting an event performed by a reported user of said plurality of users for evaluation by the jury.

In one embodiment, the application from a user to join an online community (perhaps for the first time), rejoin an online community (such as after suspension or expulsion), or—in either of these scenarios—contribute content to an online community (such as by adding content to its website, bulletin board, newsgroup, etc) may be policed according to the present invention. In this embodiment, the policing can be used instead of traditional forms of membership or content moderation.

Thus, in this embodiment, the data received by the users of the online community concerns an event in the form of either submission of an application to join/rejoin the online community, or submission of content to the online community. A plurality of eligible users are selected to form a jury which evaluates the data indicative of the event with respect to rules of the online community, and an action indicated by the evaluation is then electronically performed.

That action, in this embodiment, may be—for example—to accept the membership application, reject the membership application, accept the content, reject the content, or request further information.

It should be also noted that behaviour by the users of the online community, or of the users constituting the jury (i.e. the jurors), may also require policing, and this policing may be readily provided according to the present invention. Thus, in an embodiment, the event may be in the form of abusive behaviour or harassment by a user. In another embodiment, the event may be in the form of juror behaviour comprising, for example, violating in their evaluations the rules of the online community or the jury process, voting in a manner suggestive of prejudice, or deliberately and/or repeatedly voting against other jurors.

In another aspect, the present invention provides a system for policing events within an online community comprising a plurality of users of remote terminals having corresponding user information stored in a user database on a server, the server comprising:
 a receiving module for receiving data indicative of an event from a user of said plurality of users of the online community;
 a selection module for selecting a plurality of eligible users (such as from said plurality of users, for example based on the stored user information) to form a jury to evaluate the data indicative of the event with respect to rules for the online community stored in a rules database; and
 an action module for electronically taking an action in respect of stored user information of a user who performed the event based on the jury evaluation (determined, for example, according to votes received electronically from members of the jury) of the data with respect to the rules for the online community.

It will be appreciated by those skilled in the art that the above described method and system for policing events can be exemplified in a method and system of policing communications.

In yet another aspect, the invention provides a method of policing communications within an online community comprising a plurality of users having corresponding user information stored in a user database, the method comprising:
 receiving a report from a reporting user of said plurality of users of the online community reporting a communication indicative of an alleged offence performed by a reported user of said plurality of users;
 selecting a plurality of eligible users (such as from said plurality of users, for example based on the stored user information) to form a jury to evaluate the alleged offence; and
 electronically taking an action in respect of the stored user information of the reported user if the jury evaluates the alleged offence to have been performed by the reported user.

In an embodiment, the online community comprises a text chat community. In another embodiment, the online community comprises a video chat community. In another embodiment, the online community comprises a social networking community, such as a blog site or an image/sound/video/etc. sharing website.

In another embodiment, the online community comprises users of the Internet. For example, users of a search engine on the Internet can report a communication in the form of an website indicative of an alleged offence, such as hosting an illegal website, performed by a reported user. In this example, action could be taken against the offending website (e.g. blocking the website) if the jury evaluates the alleged offence to have been performed.

In an embodiment, the user information comprises users IP addresses. In another embodiment, the user information (e.g. IP addresses) is stored in respective user accounts stored in the user database. In this way cyber bullying is discouraged by enabling reported users to be blocked quickly and remain blocked.

In an embodiment, the user database is stored on a server. In the embodiment, the plurality of users operate a plurality of remote terminals in data communication with the server over a network. In another embodiment, the user database is distributed and stored, at least in part, at some or all of the plurality of remote terminals. In any event, the user database is accessible over the network (e.g. the Internet) by the remote terminals. In another embodiment, the method further comprises acquiring the user information (e.g. IP addresses) from each of the remote terminals to form respective user information. For example, the method comprises acquiring user IP addresses from the remote terminals participating in the online community and these IP addresses are stored in the user database so that the users forming the jury can be selected and an action can be taken in respect of a user IP address. It will be appreciated by those persons skilled in the art that user information containing the user IP addresses can be stored temporarily or for a designated time period. For example, user information having an action associated therewith may be stored for a year whereas user information without an associated action may be stored for a day.

In an example, a report is made of a communication indicative of an alleged offence, the jury evaluates the alleged offence to have been performed, and the reported user's IP address is blocked at the user database from subsequent use in the online community. In the example, if the reported user IP address attempts to re-enter the online community whilst blocked, information pertaining to the offence (e.g. the last image taken from a video chat at that IP address) is displayed to a user of the remote terminal having the same IP address. This scenario may occur if there are two or more users sharing the same remote terminal. Furthermore, user information comprising user images may used and stored, in addition to user IP addresses, to verify users. For example, if an attempt is made by a blocked user to re-enter the online community, another user of the online community is selected to evaluate whether the user image of the blocked user corresponds to the user image of the new user with the same IP address; if the user images match then the new user is blocked. Also, in the video chat example, the user images may be presented to the users before commencing the chat so that they can determine whether they wish to enter the video chat session.

In an embodiment, the method further comprises electronically taking an action in respect of the stored user information of the reporting user if the jury evaluates the alleged offence to not have been performed by the reported user. In the embodiment, the method further comprises electronically taking an action in respect of the stored user information of the reporting user if the reporting user is regularly, such as greater than, say, 70% of the time, the dissenting member of the jury.

In an embodiment, the action comprises electronically associating a warning with the stored user information of the reported user in the user database if the jury evaluates the alleged offence to have been performed by the reported user. In another embodiment, the action further comprises electronically associating a warning with the stored user information of the reporting user if the jury evaluates the alleged offence to have not been performed by the reported user. That is, warnings are associated with the stored user information of the reporting user if the report of an alleged offence is not justified as the alleged offence has been evaluated by the jury to not have been performed and warnings are associated with the reported user if the report of the alleged offence is justified as the alleged offence has been evaluated by the jury to have been performed. In this manner, users are dissuaded from unjustly reporting other users of the online community.

In an embodiment, the action further comprises blocking the stored user information of the reported or the reporting user from the online community if three of the warnings are associated with respective stored user information of the reported or the reporting user in the user database. It will be appreciated by those persons skilled in the art that the number of warnings that may associated with a user before the user information is blocked is arbitrary (e.g. users can be blocked after receiving five warnings). It will also be appreciated that the user accounts containing the stored user information may be blocked from being used in the online community.

In an embodiment, the method further comprises associating the warning with the stored user information of the reported user if more than half of the jury evaluates the alleged offence to have been performed. In another embodiment, the method further comprises associating the warning with the stored user information of the reporting user if more than or equal to half of the jury evaluates the alleged offence to not have been performed.

In an embodiment, the method further comprises storing information pertaining to the alleged offence for each user which can be associated with the stored user information of the reporting user and/or the reported user in the user database, in, for example, the respective user accounts, if the report is received from the reporting user. In addition, the method further comprises storing the information in respective buffers for each user for a designated period of time before the alleged offence is reported (e.g. 30 seconds). In the embodiment, the method further comprises communicating the buffer of the reporting user (and/or the reported user) to the eligible users of the jury if the report is received from the reporting user. Furthermore, the method further comprises the jury evaluating the alleged offence performed by the reported user based on the communicated information. Also the method comprises receiving respective evaluations of the jury, so that action can be taken in respect of the user information of the reported user and/or the reporting user.

In an embodiment, the information comprises images from respective displays of each user. In another embodiment, the information comprises text from respective displays of each user. As described, the images or text are stored in respective buffers capturing a designated period of time before the alleged offence is reported.

In an example, each remote terminal comprises a buffer of images or text capturing the 30 seconds before the alleged offence is reported. In the example, a reporting user reports a reported user for an alleged offence and the report of the alleged offence along with the buffer of the reporting user storing the previous 30 seconds before the alleged offence was reported is communicated to the server over the network and associated with the stored user information of the reporting user and/or the reported user in the user database. It will be appreciated by those skilled in the art that the buffers from the reporting and the reported user comprise the same information pertaining to the alleged offence and, for example, the buffer of the reported user may be communicated to the server. The buffers thus include images or text pertaining to the alleged offence and are communicated to the jury for evaluation. In another example, the images or text from the respective displays of the remote terminals of each user are communicated to the user database periodically. In any case, the jury is provided with the buffer (e.g. the last 30 seconds of video chat containing the offence) so that the jury can evaluate whether the alleged offence was in fact performed by the reported user.

In an embodiment, the method further comprises communicating the communication indicative of the alleged offence performed by the reported user to the eligible users of the jury if the report is received from the reporting user. In the embodiment, the method further comprises the jury evaluating the alleged offence performed by the reported user based on the communicated communication. It will be appreciated by those persons skilled in the art that communications comprise any content, such as text, video, images, sound, blog entries, etc., and the websites hosting the content themselves.

In an embodiment, the alleged offence comprises an alleged serious offence and an alleged lesser offence. In the embodiment, the action further comprises blocking the stored user information of the reported user from the online community if the jury evaluates the alleged serious offence to have been performed. That is, a user deemed to have performed a serious offence is blocked from the online community rather than merely warned. For example, an alleged serious offence may comprise inappropriate user nudity in a particular video chat community. In this case, if the jury evaluates that the reported user did in fact perform the alleged offence of inappropriate nudity then the reported user is blocked from the online community at the user database. It is envisaged that the user associated with the blocked user is identified in some way so that any subsequent request from the blocked user to rejoin the online community is denied. It is also envisaged that blocking a user may not be a permanent block from the online community. For example, users may be blocked for a designated period of time, such as a week, and this may vary based on the severity of the offence performed.

It will be appreciated by those persons skilled in the art that the user information may be generated by a server hosting the user database and derived from respective user remote terminals, such as from their IP addresses, to ensure that users can be prevented, or at least discouraged, from re-entering the online community whilst blocked.

In an embodiment, the alleged offence comprises an offence value. For example, an alleged offence may have weighting values ranging from 1 to 5 with 5 being the most serious offence. In this example, a reporting user can specify the value of the alleged offence and the jury can evaluate both whether the alleged has been performed and whether the value of the offence is justified. Alternatively, the jury can evaluate the value of the offence (e.g. a majority of the users of the jury can evaluate that an offence should have a weighting value of 3). In the embodiment, the action comprises electronically associating the offence value with the stored user information of the reported user if the jury evaluates the alleged offence to have been performed by the reported user. Furthermore, the action further comprises blocking the stored user information of the reported user from the online community if accumulated offence values associated with the stored user information of the reported user reach a designated value (e.g. 10).

In an embodiment, the method further comprises an administrator in data communication with the user database evaluating the alleged offence performed by the reported user in response to the reported or the reporting user appealing the evaluation of the jury. It will be appreciated by those persons skilled in the art that the administrator may comprise one or more moderators to evaluate the alleged offence and determine whether the appeal is justified. The decision of the administrator is then sent to the user database to associate a warning, block a user, or take no action, accordingly. It will also be appreciated that the evaluation of the jury can be appealed based on a different designated appeal process, such as appealing to a different jury.

In an embodiment, the alleged offence comprises a contradiction of online community rules stored in the user database. For example, in some online video chat communities nudity is permissible whereas in other online video chat communities it is contrary to the online community rules.

In another embodiment, the online community comprises an online dating community. In this embodiment, the alleged offence may comprise an inappropriate picture reported by one of the users of the online dating community. Upon receiving details of the alleged offence (e.g. the picture under consideration), the jury evaluates whether the picture is in fact inappropriate and the reported user is warned/blocked as described above if the report was justified. Also, as described, the alleged offence may comprise any action contrary to the rules of the online dating community. Thus, in this example, posting pictures of someone else in your profile is deemed an offence by the rules and all pictures posted can be evaluated by the jury to ensure that the rules of the online community are maintained.

In an embodiment, the eligible users satisfy eligibility criteria stored in the user database. For example, the eligibility criteria comprises an age restriction and thus only users from the plurality of users above a certain age (e.g. 16) can be selected to form the jury. In an example, each user is required to enter user details, including age, to participate in the online community and these details are stored in association with the respective user information in the user accounts. In another example, the eligibility comprises a designated period of time to evaluate the alleged offence.

In another aspect, the invention provides system for policing communications within an online community comprising a plurality of users of remote terminals having corresponding user information stored in a user database on a server, the server comprising:

a receiving module for receiving a report from a reporting user of the plurality of users of the online community reporting a communication indicative of an alleged offence performed by a reported user of the plurality of users;

a selection module for selecting a plurality of eligible users (such as from the plurality of users, for example based on the stored user information) to form a jury to evaluate the alleged offence; and an action module for electronically taking an action in respect of the stored user information of the reported user if the jury evaluates the alleged offence to have been performed by the reported user.

In another aspect, the invention provides computer program code which when executed implements the above method.

In another aspect, the invention provides a tangible computer readable medium comprising the above program code.

In another aspect, the invention provides transmitting or receiving the above program code.

It should also be noted that the various aspects of the invention described above allow the evaluation of event or alleged offence essentially in real-time.

It should be noted that any of the various features of each of the above aspects of the invention, and of the various features of the embodiments described below, can be combined as suitable and desired.

BRIEF DESCRIPTION OF THE DRAWINGS

In order that the present invention may be more clearly ascertained, exemplary embodiments of the invention will now be described with reference to the accompanying drawings, in which.

DETAILED DESCRIPTION

Figure 1:
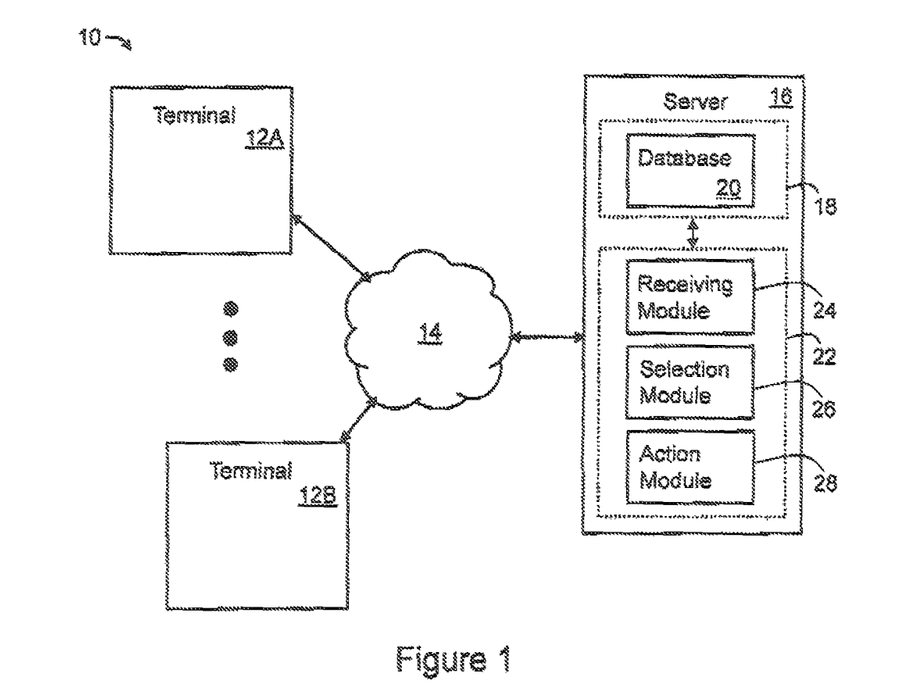
FIG. 1 is a schematic diagram of a system for policing an online community according to an embodiment of the invention.

According to an embodiment, FIG. 1 shows a system 10 for policing events within an online community comprising a plurality of users of remote terminals 12A, . . . , 12B having user information stored in a user database 20. In the embodiment, the user database 16 and the rules database (not shown) are stored in a memory 18 of a server 16 and accessible by the plurality of users of remote terminals over a network 14.

In the embodiment, the server 16 comprises a memory 18 and a processor 22 to process instructions stored on a database 20 residing in the memory 18 to police the online community. In particular, the processor 22 implements a number of modules to police the online community including a receiving module 24 for receiving data indicative of the event from a user of the online community. In one example, the event is reported by a user of the online community for evaluation by the jury. However, it will be appreciated by those skilled in the art that the event may be automatically reported (e.g. selected) for evaluation by the jury based on the online community rules stored in the database 20.

The processor 22 of the server 16 also comprises a selection module 26 for randomly selecting a plurality of eligible users of said plurality of users based on the stored user accounts to form a jury to evaluate the data indicative of the event. Also, the processor 22 comprises an action module 28 for electronically taking an action in respect of stored user information of a user who performed the event based on the jury evaluation of the data with respect to the rules stored in the database 20.

Figure 2:
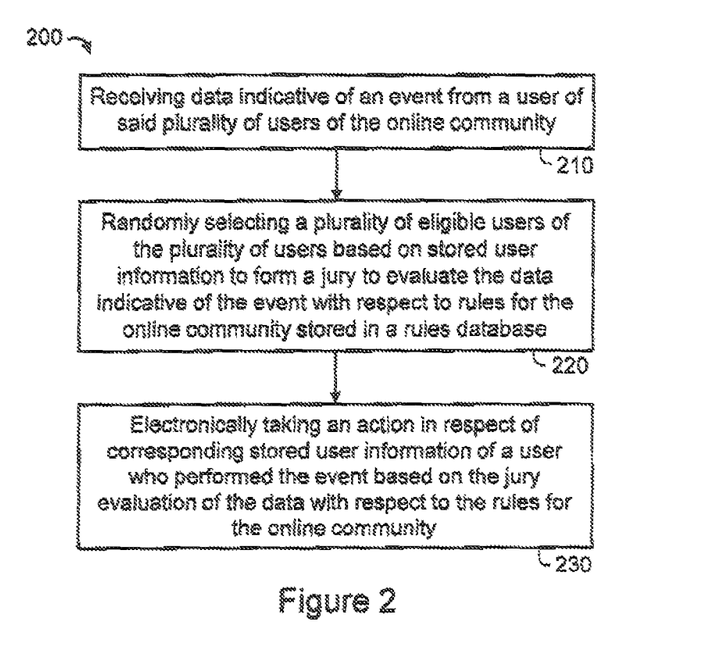
FIG. 2 is a flow chart of a method of policing an online community according to an embodiment of the present invention.

FIG. 2 shows a method 200 of policing events within an online community and involves the steps of receiving 200 data indicative of an event from a user of the online community, randomly selecting 220 a plurality of eligible users of the plurality of users based on stored user information (e.g. user IP address) to form a jury to evaluate the data indicative of the event with respect to rules for the online community stored in a rules database, and electronically taking 230 an action in respect of corresponding stored user information of a user who performed the event based on the jury evaluation of the data with respect to the rules for the online community.

In an example, the event includes a communication in the form electronically publishing a media file in the online community, such as a picture. In the example, the stored rules state that pictures must be sanitised and nudity is not allowed, and the picture is received by the jury for evaluation upon a report by another user. In another example, the picture is not published until the jury evaluates the picture. In any case, the system 10 takes an action in the form of electronically enabling the picture in the user database to be published if the jury evaluates the data to be sanitary.

In the example described below, the system 10 is exemplified in a system 100 for policing communications within an online community, as shown in FIGS. 3 to 8. The system 100 comprises a plurality of users of remote terminals 12A, . . . , 12B having user information stored in a user database 20. In the example, the user database 16 is stored in a memory 18 of a server 16 and accessible by the plurality of users of remote terminals over a network 14. It will be appreciated by those persons skilled in the art, however, that the user database 20 may be distributed amongst the user remote terminals 12A, . . . , 12B as described above. It will also be appreciated that the network 14 comprises the Internet 14, or may comprise some other network such as a local area network, and the terminals are configured to communicate accordingly.

Figure 3:
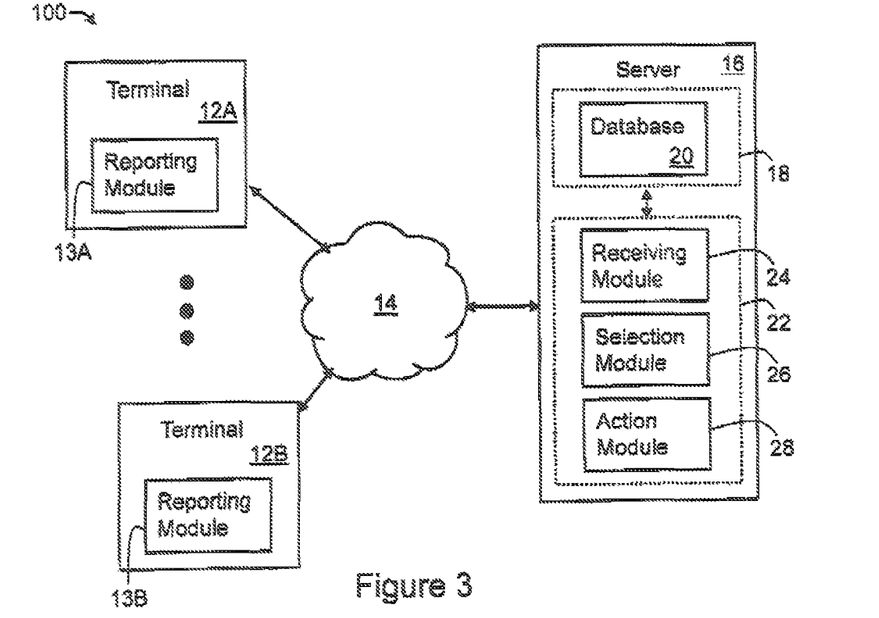
FIG. 3 is a schematic diagram of a system for policing an online community according to an embodiment of the invention.

In the embodiment, the server 16 comprises a memory 18 and a processor 22 to process instructions stored on a database 20 residing in the memory 18 to police the online community. In particular, the processor 22 implements a number of modules to police the online community including a receiving module 24 for receiving a report from a reporting user of the users of the online community reporting a reported user of the users for an alleged offence performed by the reported user.

As described, the user information is stored in the user database 20 and may be associated with unique user accounts having membership numbers generated by the server 16 by an algorithm stored in the database 20. For example, the algorithm is based on a user criteria such as the user remote terminal's IP address or may be otherwise designated by the server 16. Also, it will be appreciated that the plurality of users of the remote terminals 12A, . . . , 12B register to participate in the online community. Upon doing so, the users are electronically associated with respective user accounts which are stored in the server 16 in the database 20.

The processor 22 of the server 16 also comprises a selection module 26 for randomly selecting a plurality of eligible users of said plurality of users based on the stored user accounts to form a jury to evaluate the alleged offence. The selection module 26 may employ a random number generator in association with stored instructions, such as eligibility criteria, in the database 20 to select users of the online community to form the jury.

The processor 22 of the server 16 further comprises an action module 28 for electronically taking an action in respect of the stored user information of the reported user if the jury evaluates the alleged offence to have been performed by the reported user. In addition, the action module 28 can electronically take an action in respect of the stored user information of the reporting user if the jury evaluates the alleged offence to not have been performed by the reported user.

In an example, the jury comprises a minimum of ten eligible users (e.g. over 16 years of age) and the selection module 26 randomly selects ten such users from the online community based on the user information stored in the user accounts to form the jury in response to receipt of a report from a reporting user remote terminal 12A of the online community reporting another one of the users, of remote terminal 12B, for an alleged offence. In the example, the server 16 sends a notification of jury duty to the selected users' remote terminals over the Internet 14, including information pertaining to the alleged offence, which may include the communication indicative of the alleged offence itself (e.g. an image), and waits for a designated period of time (e.g. 30 seconds), stored as eligibility criteria in the database 20, to receive a reply or until receiving ten replies from the selected users advising their evaluations of the alleged offence over the Internet 14. If after the designated period of time the sever 16 has only received eight replies, the selection module 26 randomly selects two further eligible users to form the jury and again waits for a designated period of time to receive replies. Alternatively, there may be a designated minimum number of replies before a jury evaluation is made, such as eight replies, and this number is also stored in the database 20.

In any event, the action module 28 electronically takes an action in respect of the reported or reporting user information if the jury evaluates the alleged offence to have or have not been performed by the reported user. In an embodiment, the action module 28 takes action in the form of associating a warning with the stored user information of the reported or reporting users in the database 20 if the jury evaluates that the alleged offence has been or has not been performed by the reported user accordingly.

In a further example, users of the remote terminals 12A, . . . , 12B are required to register their details before participating in the online community. In this case, the server 16 stores these details in the database 20 in the respective user accounts. Also, some user details, such as age or date of birth, forms eligibility criteria and may be used by the selection module 26 to select eligible users to form the jury. The user details may also include user registration information, such as email, name, address, password, picture, interests, IP address, etc., along with information indicative of any warning/blocking for an alleged offence or an unjustified report of a user. In addition, the database 20 also stores data indicative of whether a user is blocked from the online community, with the reason, in association with the associated user accounts. For example, a reported or reporting user may be blocked if three of the above mentioned warnings are associated with their respective stored user information and, in this case, the users may be blocked for the designated period of time of a week.

Each terminal 12A, ..., 12B also comprises respective reporting modules 13A, ..., 13B implemented by processors (not shown) in association with instructions stored in memories (also not shown) to participate in the online community, such as a video chat community. In an example, the reporting modules 13A, ..., 13B are implemented by the respective processors configured to communicate with the server 16 over the Internet 14. For example, the reporting modules 13A, ..., 13B communicate a HTTP request, via asynchronous Javascript, XML, etc., to the server 16, for example, advising that a user has been reported for an alleged offence. The reporting modules 13A, ..., 13B may also communicate information such as user registration details to the server 16 to be stored in the database 20 using HTTP request.

In an embodiment, the processor 22 of the server 16 comprises an association module (not shown) for associating information into the database 20 including the above mentioned HTTP requests. The association module also associates information pertaining to an alleged offence stored in buffers by each of the reporting modules 13A, ..., 13B with the reporting and the reported user information in the database 20 of the server 16. In the example of a video chat online community, the reporting modules 13A, ..., 13B of the respective remote terminals 12A, ..., 12B record information indicative of the video chat, such as images taken from a video chat between two users taken a designated time intervals (e.g. every 0.1 seconds) for a designated period of time before the alleged offence is reported (e.g. 30 seconds), which would thus include information pertaining to the alleged offence. Information in the form of images of the video chat from respective displays of the remote terminals is stored by each reporting module 13A, ..., 13B in buffers in the respective memories of the remote terminals 12A, ..., 12B. As described, the buffers contain images detailing the last thirty seconds of video chat before the alleged offence was reported, should the reporting user report the alleged offence to the server 16 soon after it takes place.

In the example, the server 16 receives the report of the alleged offence and the information stored in the buffer of the reporting user remote terminal 12A over the Internet 14. As described, the information includes images detailing the alleged offence. Alternatively, the respective reporting modules 13A, ..., 13B may communicate images of the video chat periodically to the server 16 and the server stores these images in a plurality of buffers of x seconds (e.g. 30 seconds) dedicated to each video chat. In any case, the images are communicated to the jury so that it can evaluate the alleged offence performed by the reported user. In addition, in the example of a text chat online community, the information comprises text from the respective displays of the remote terminals and this is communicated to the server 16 over the Internet 14 in the same fashion.

Figure 4:
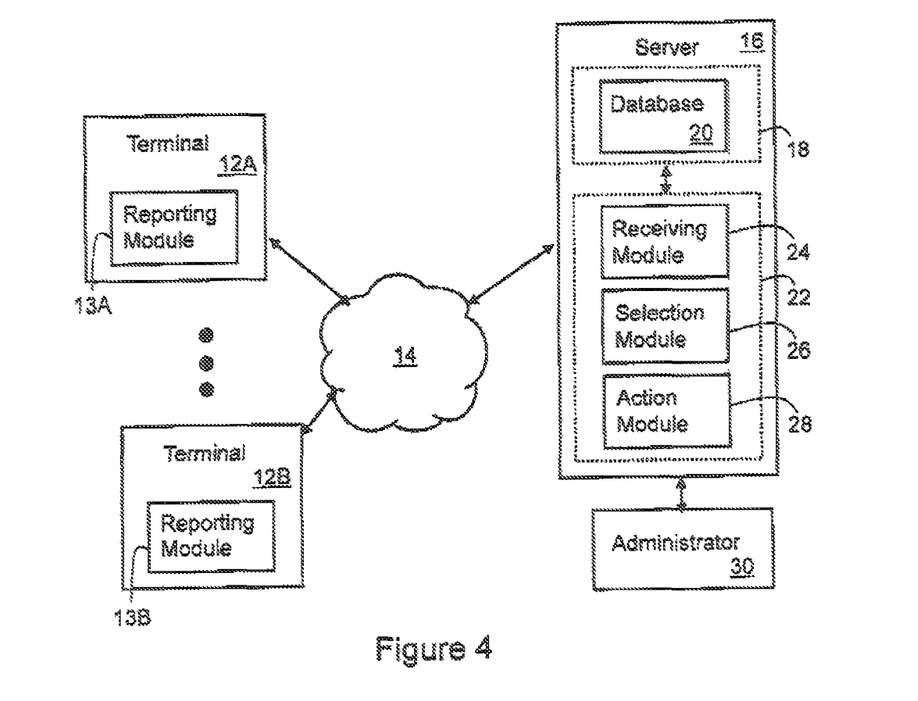
FIG. 4 is a further schematic diagram of the system of FIG. 3.
Figure 5:
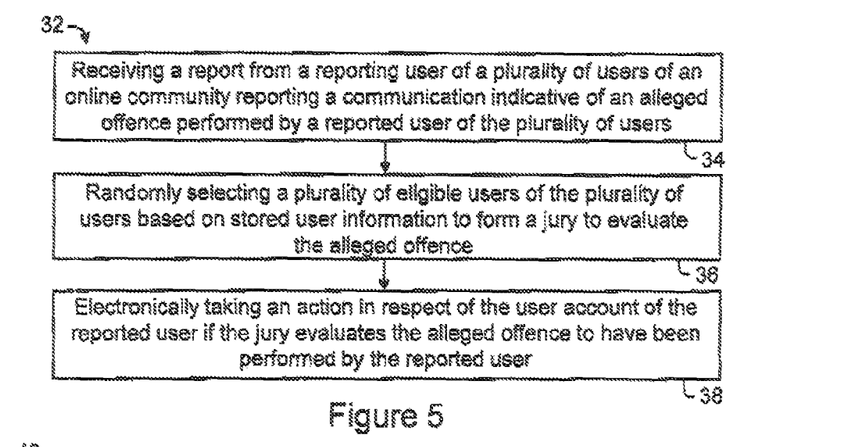
FIG. 5 is a flow chart of a method of policing an online community according to an embodiment of the present invention.

Furthermore, if the reported user or the reporting user is dissatisfied with the evaluation of the jury and the resultant action taken by the action module 28, the evaluation can be appealed to an administrator 30 as shown in FIG. 4. In this case, the administrator 30 is in data communication with the server 16 and receives information pertaining to the alleged offence so that it can evaluate the alleged offence performed by the reported user and evaluate whether the evaluation of the jury was justified. The determination of the administrator 30 is then advised to the server 16 and an action, such as a warning or blocking, is taken in respect of the stored user information of the reported or the reporting user in the database 20 if justified.

In the example of a video chat community, users wishing to participate are required to enter details using their respective terminals 12A, ..., 12B to communicate these details to the server 16 so that they can be stored in eth database 20. This may be achieved using a sign up form with a number of designated fields to be populated including name, address, email address, password, interests, etc. User accounts, containing this user information, are then generated for the users with unique membership numbers, which may be associated to the users email address (e.g. the users' email addresses form login information). Once a basic email validation process has occurred, the users are then free to participate in the video chat community by sending/receiving requests to chat with other users. In an example, the users send requests based on the user entered details, such as interests, country, date of birth etc.

As described, once a video chat commences, the respective reporting modules 13A, ..., 13B record images of the video chat at periodic intervals (e.g. every 0.1 second) to fill a buffer with images (e.g. 300 images for a 30 second buffer) recording the last 30 seconds of the video chat. At any time in the video chat, a user can report another user for an alleged offence such as inappropriate behaviour, false identity, bad language, unauthorised advertisement, nudity, etc. In an example, the user of the remote terminal 12A can select a report button during the video chat to stop the video chat and report another participating user, using the remote terminal 12B, for an alleged offence. The reporting module 13A then prompts the reporting user for the reason for the request to report a user and may also include a comment field enabling the reporting user to enter the reason for the offence. The reporting module 13A then sends the buffer to the server 16 over the Internet 14 in association with the report, and the server 16 can then send the buffer to each of the users selected to form the jury over the Internet 14. As described, the server 16 randomly selects eligible users based on the stored user information, including eligibility criteria stored with respect to the user information in the user accounts, and sends each selected user a notification over the Internet 14 that they have been selected for jury duty. If an evaluation of the alleged offence is not made within a designated period of time (e.g. 30 seconds), further users are selected and notified by the server 16 until a designated number of users (e.g. 10 users) have evaluated the alleged offence based on the information stored in the buffer.

It will be appreciated by those skilled in the art that the above method of policing a video chat community could also be used to police a text chat community. In this case, the respective reporting modules 13A, ..., 13B store text detailing the conversation between users participating in the text chat in a buffer comprising the last text conversation. This buffer is then communicated to the server 16 if an alleged offence has been reported in the manner described above.

It will also be appreciated that the alleged offence comprises a contradiction of online community rules stored also in the database 20 on the server 16. In an example, the online community comprises an online dating community where users are able to interact with each other using text and/or video, and offences are specified in the rules stored in the database 20. For example, participating users can conduct a text or video chat to organise to meet in person. In this case, the respective reporting modules 13A, ..., 13B store in a buffer a record of the text and/or video chat for a designated period of time before the chat ceases (e.g. ten minutes), and a user can subsequently report another user for an alleged offence occurring during the meeting. If so, the details of the chat to organise the meeting are communicated to the members of the jury in the same fashion as if the alleged offence took place in the chat, along with details of the alleged offence and details of the last chat, to evaluate whether the offence has or has not been performed. For example, an alleged offence may be misrepresentation and after a meeting between two users, one user may report the other user for an alleged misrepresentation of identity.

Figure 6:
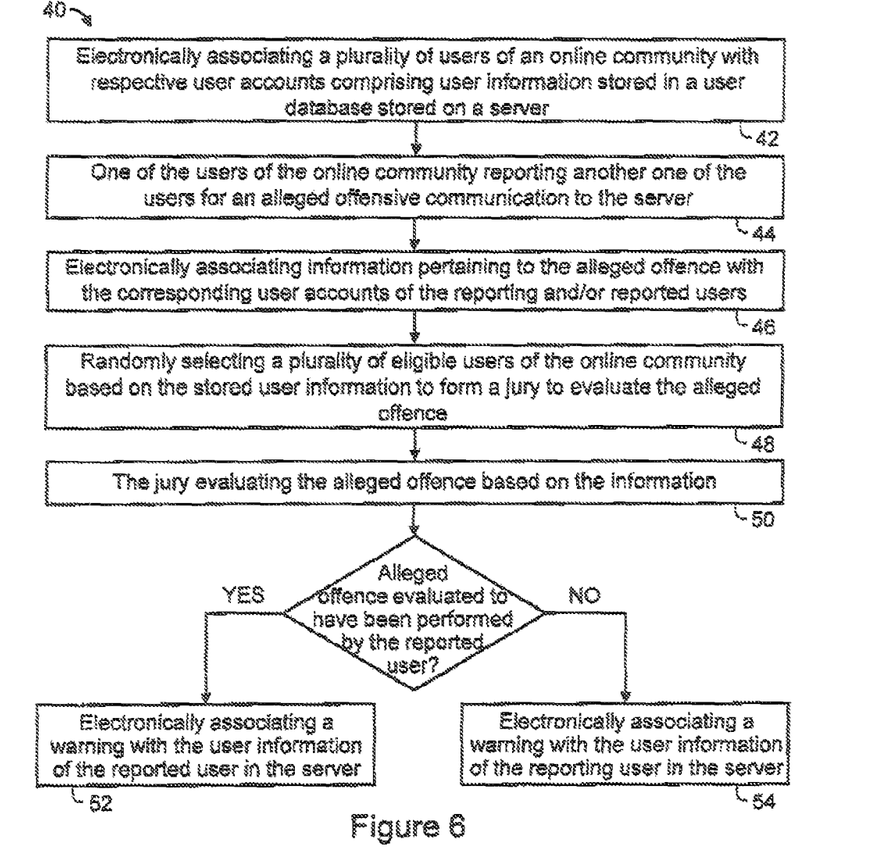
FIG. 6 is a further flow chart of the method shown in FIG. 5.

Referring now to FIG. 6, an example of a method 40 of policing communications within an online community is described in use. That is, the method 40 involves the steps of first electronically associating 42 a plurality of users of an online community with respective user accounts comprising user information stored in a user database stored on a server. In the example, one of the users of the online community reports 44 another one of the users for an alleged offensive communication (e.g. an offensive post in a blog site) to the server and the method 40 further comprises electronically associating 46 information pertaining to the alleged offence with the corresponding user accounts of the reporting and/or reported users. The method 40 then involves randomly selecting 48 a plurality of eligible users of the online community based the stored user information to form a jury to evaluate the alleged offence and the jury subsequently evaluating 50 the alleged offence based on the information communicated to each member of the jury and, depending on their evaluation, the method either involves taking an action in the form of electronically associating 52 a warning with the stored user information of the reported user in the server if the jury evaluates the alleged offence to have been performed or electronically associating 54 a warning with the stored user information of the reporting user in server if the jury evaluates the alleged offence to not have been performed.

Figure 7:
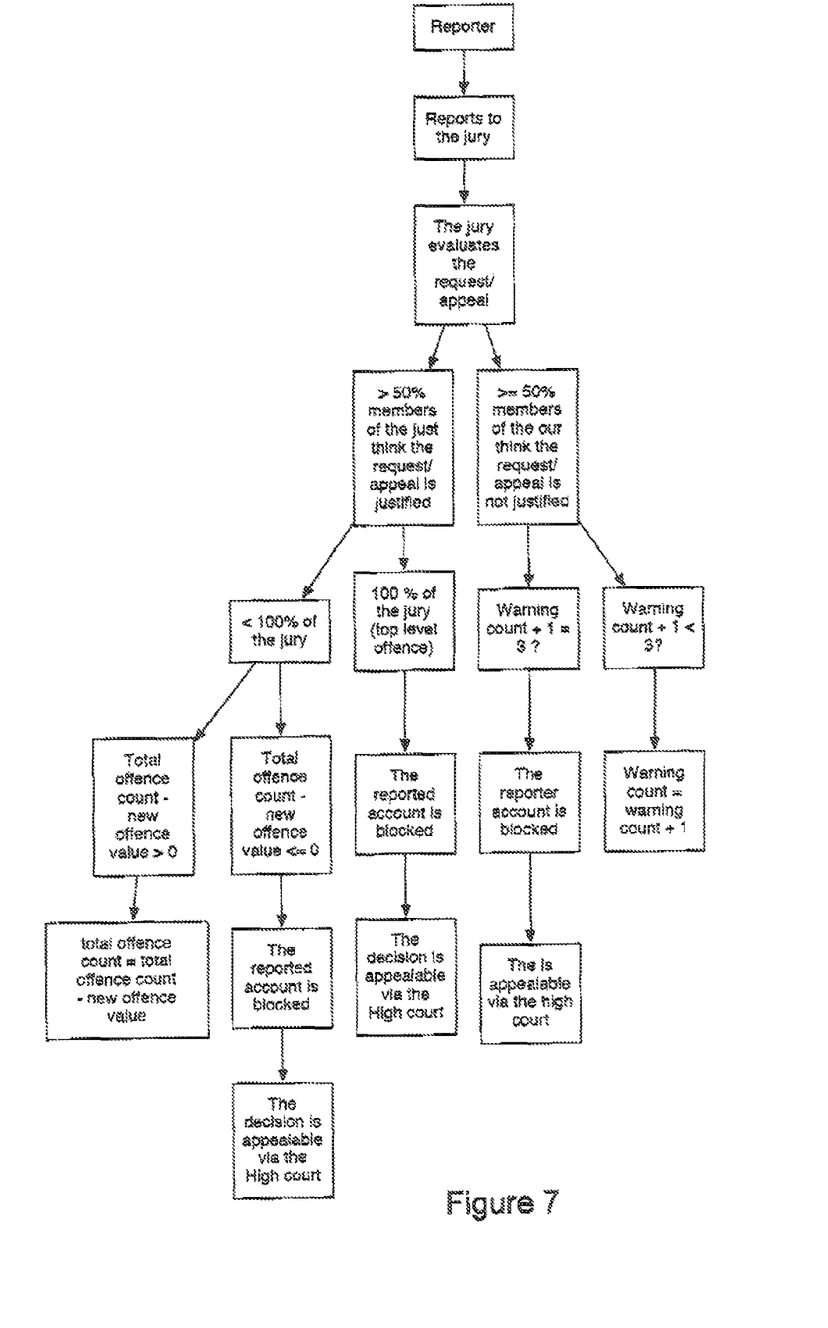
FIG. 7 is a further flow chart of the method shown in FIG. 5.

FIG. 7 shows a further example of a method of policing communications within an online community in use. In this example, it can be seen that a user reports a communication indicative of an alleged offence performed by another user and the report is communicated to the selected jury as a request for evaluation by the jury. The jury evaluates the request from the reporting user and if greater than 50% of the users forming the jury evaluate the request to be justified then the reported user information, and thus the user account, is either blocked for future use or a warning is associated accordingly. If greater than or equal to 50% of the jury evaluates the request to not have been justified then a warning is issued to the reporting user and associated with the reporting user information accordingly. Furthermore, if it is the third warning then the reporting or reported user information, and thus the user account, is blocked by the above mentioned means. As described, the evaluation of the jury can be appealed to an administrator, which is shown as the "High Court" in FIGS. 7 and 8.

In addition, the example shown in FIG. 7 shows that an alleged offence may comprise an offence value or weighting, such as an offence value ranging from 1 to 5, based on the severity of an alleged offence. In this case, a maximum offence count may be specified and if this maximum offence count is accumulated by a user account then the user is blocked or warned accordingly. Also, if the alleged offence is a high level offence, such as a serious offence having an offence value of 5, then the reported user account can be blocked if all of the members of the jury evaluate the alleged offence to be justified.

Figure 8:
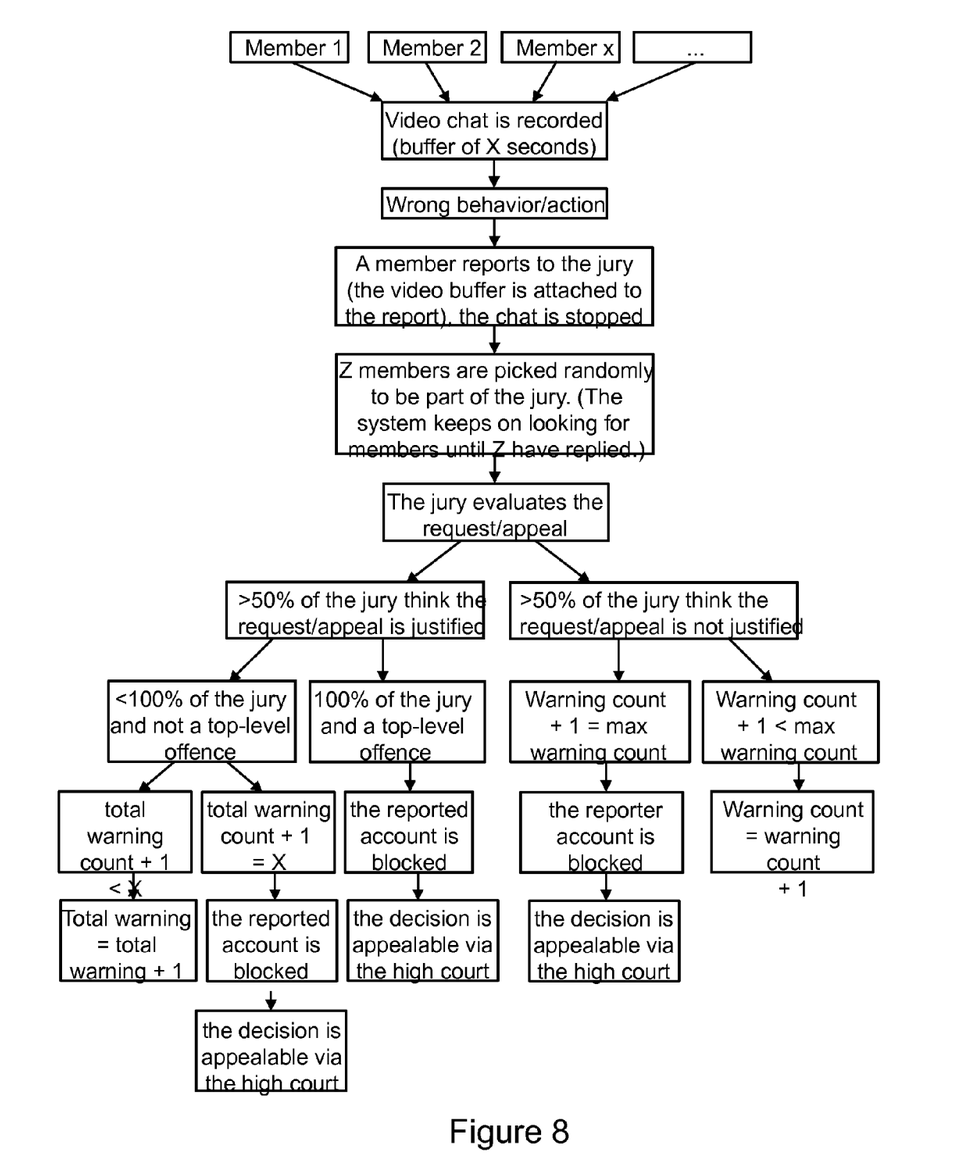
FIG. 8 is a further flow chart of the method shown in FIG. 5.

FIG. 8 shows an example of policing an online video chat community. In the example, members 1, 2, . . . , x (e.g. users) register to participate in a video chat community and, upon a video chat commencing between some of the members, a buffer recording the last x seconds of the video chat is stored for those members. In the example, a member then performs an alleged offensive communication and one of the members of the video chat reports the alleged offence to a selected jury. The video chat is thus stopped and a buffer of the last x seconds of video is communicated to the selected members of the jury. In the example shown, the members of the jury are selected randomly and a designated number of members must have evaluated the alleged offence before an evaluation is made. If greater than 50% of the jury evaluates the offence to be justified, the reported user is warned accordingly and/or potentially blocked. If greater than 50% of the jury evaluate the request to not be justified, the reporting user is warned and/or potentially blocked accordingly.

Referring back to FIG. 5, a method 32 of policing communications within an online community is now summarised. The method 32 involves the steps of receiving 34 a report from a reporting user of a plurality of users of an online community reporting a communication indicative of an alleged offence performed by a reported user of the plurality of users, randomly selecting 36 a plurality of eligible users of the plurality of users based on stored user information (e.g. user IP address) to form a jury to evaluate the alleged offence, and electronically taking 38 an action in respect of the stored user information of the reported user if the jury evaluates the alleged offence to have been performed by the reported user.

Further aspects of the method 32 will be apparent from the above description of the system. It will be appreciated that at least part of the method 32 will be implemented digitally by processor. A person skilled in the art will also appreciate that the method could be embodied in program code. The program code could be supplied in a number of ways, for example, on a tangible computer readable storage medium, such as a disk or memory, or a starter signal (for example by transmitting it from a server). A person skilled in the art will appreciate that program code provides a series of instructions executable by the processor.

It will be understood to persons skilled in the art of the invention that many modifications may be made without departing from the spirit and scope of the invention.

It is to be understood that, if any prior art is referred to herein, such reference does not constitute an admission that the art forms a part of the common general knowledge in the art, in any country.

Furthermore, in the claims that follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of policing online events within an online community comprising a plurality of users having corresponding user information stored in a user database, the method comprising:
　　receiving data indicative of an online event from a user of said plurality of users of the online community, the online event having been performed by a current user of the online community or by a prospective user of the online community;
　　forming a jury by selecting a plurality of eligible users to evaluate the data indicative of the event with respect to rules for the online community stored in a rules database;
　　receiving data indicative of an evaluation by the jury of the data indicative of the event with respect to the rules for the online community, and electronically taking an action in respect of corresponding stored user information of a the current or prospective user who performed the event based on the jury evaluation of the data with respect to the rules for the online community;

wherein the rules specify one or more of, (i) ethical behavior of the online community (ii) courteous behavior of the online community, (iii) behavior that accords with stipulated values of the online community (iv) lawful behavior of the online community, and (v) conditions of membership of the online community.

2. A method as claimed in claim 1, wherein said plurality of eligible users is selected from said plurality of users.

3. A method as claimed in claim 2, wherein said plurality of eligible users is selected based on the stored user information.

4. A method as claimed in claim 1, wherein said event comprises electronically publishing a user profile within the online community.

5. A method as claimed in claim 1, wherein the rules for the online community comprise users publishing verified user profiles.

6. A method as claimed in claim 4, wherein said action comprises electronically verifying the user profile in the user database for publication if the jury evaluates the data to verify the user.

7. A method as claimed in claim 6, wherein said action further comprises storing said user profile in association with the corresponding user information in the user database.

8. A method as claimed in claim 6, wherein the data comprises verification data of the user.

9. A method as claimed in claim 8, wherein the verification data comprises a video or other media file created by the user to be evaluated by the jury to verify the user profile.

10. A method as claimed in claim 1, wherein said event comprises a communication within the online community.

11. A method as claimed in claim 1, wherein said communication comprises electronically publishing a media file within the online community.

12. A method as claimed in claim 11, wherein the rules for the online community comprise users publishing sanitized media files.

13. A method as claimed in claim 12, wherein said action comprises electronically enabling the media file in the user database to be published if the jury evaluates the data to be sanitary.

14. A method as claimed in claim wherein said action further comprises storing said media file in association with the stored user information in the user database.

15. A method as claimed in claim 13, wherein the data comprises the media file.

16. A method as claimed in claim 1, further comprising receiving a report from a reporting user of said plurality of users of the online community reporting an event performed by a reported user of said plurality of users for evaluation by the jury.

17. A method as claimed in claim 1, wherein said event comprises submission of an application to join or rejoin the online community.

18. A method as claimed in claim 1, wherein said event comprises (i) submission of an application to join or rejoin the online community, or (ii) submission of content to the online community.

19. A method as claimed in claim 18, wherein said action comprises accepting or rejecting said submission.

20. A method as claimed in claim 1, wherein said event comprises one or more instances of juror behavior.

21. A method as claimed in claim 1, wherein selecting the plurality of eligible users to form the jury includes random selection from a larger group of possible eligible users.

22. A system for policing online events within an online community comprising a plurality of users of remote terminal having corresponding user information stored in a user database on a server, the server comprising:

receiving module for receiving data indicative of an online event from a user of said plurality of users of the online community, the online event having been performed by a current user of the online community or by a prospective user of the online community;

a selecting module for forming a jury by selecting a plurality of eligible users to evaluate the data indicative of the event with respect to rules for the online community stored in a rules database;

an action module for receiving data indicative of an evaluation by the jury of the data indicative of the event with respect to the rules for the online community, and electronically taking an action in respect of corresponding stored user information of a the current or prospective user who performed the event based on the jury evaluation of the data with respect to the rules for the online community;

wherein the rules specify one or more of, (i) ethical behavior of the online community (ii) courteous behavior of the online community, (iii) behavior that accords with stipulated values of the online community (iv) lawful behavior of the online community, and (v) conditions of membership of the online community.

23. A system as claimed in claim 22, wherein said selection module is configured to select said plurality of eligible users from said plurality of users.

24. A system as claimed in claim 23, wherein said selection modulo is configured to select said plurality of eligible users based on the stored user information.

25. A method of policing electronic communications within an online community comprising a plurality of users having corresponding user information stored in a user database, the method comprising:

receiving a report from a reporting user of said plurality of users of the online community reporting an electronic communication indicative of an alleged online offence performed by a reported user of said plurality of users;

forming a jury by selecting a plurality of eligible users to evaluate the alleged offence; and electronically taking an action in respect of the stored user information of the reported user if the jury evaluates the alleged offence to have been performed by the reported user.

26. A method as claimed in claim 25, wherein said plurality of eligible users is selected from said plurality of users.

27. A method as claimed in claim 26, wherein said plurality of eligible users is selected based on the stored user information.

28. A system for policing electronic communications within an online community comprising a plurality of users of remote terminals having corresponding user information stored in a user database on a server, the server comprising:

a receiving module for receiving a report from a reporting user of said plurality of users of the online community reporting an electronic communication indicative of an alleged online offence performed by a reported user of said plurality of users;

a selection module for forming a jury by selecting a plurality of eligible users to evaluate the alleged offence; and an action module for electronically taking an action in respect of the stored user information of the reported user if the jury evaluates the alleged offence to have been performed by the reported user.

29. A system as claimed in claim 28, wherein said selection module is configured to select said plurality of eligible users from said plurality of users.

30. A system as claimed in claim 29, wherein said selection module is configured to select said plurality of eligible users based on the stored user information.

31. A non-transitory tangible computer readable medium comprising computer program code which when executed implements the method of claim 1.

32. Transmitting or receiving the program code of claim 31.

33. A non-transitory tangible computer readable medium comprising computer program code which when executed implements the method of claim 25.

34. Transmitting or receiving the program code of claim 33.

* * * * *